Dec. 15, 1953  J. WIJCHMAN  2,662,765
SECURING OF A MEMBER TO A SUPPORT BY MEANS OF A SPRING
Filed Feb. 24, 1950
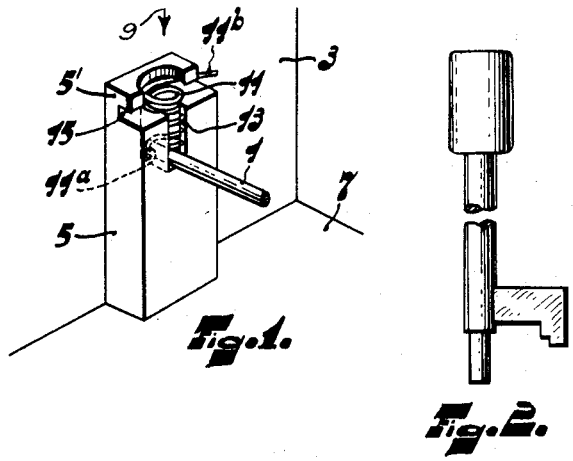
Fig. 1.
Fig. 2.
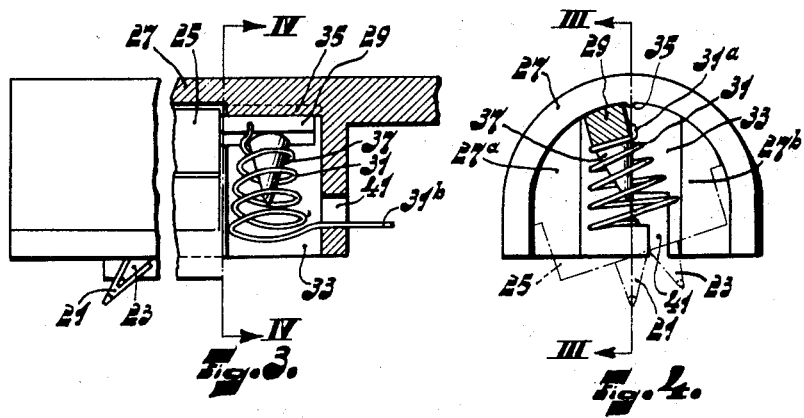
Fig. 3.
Fig. 4.
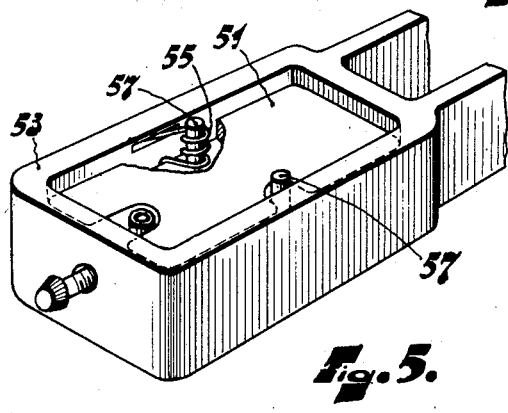
Fig. 5.
INVENTOR.
JAN WIJCHMAN
BY
AGENT Patented Dec. 15, 1953

2,662,765

UNITED STATES PATENT OFFICE 2,662,765

SECURING OF A MEMBER TO A SUPPORT BY MEANS OF A SPRING

Jan Wijchman, Eindhoven, Netherlands, assignor to Hartford National Bank and Trust Company, Hartford, Conn., as trustee Application February 24, 1950, Serial No. 145,998

Claims priority, application Netherlands March 19, 1949

7 Claims. (Cl. 267—1)

This invention relates to the securing of a member to a support by means of a spring.

The object of the invention is to provide a cheap and compact manner of securing a small member to a support for example the pick-up head of a gramophone to a pick-up arm. The invention furthermore has for objects to enable the securing operation to be carried out in an easy way, to prevent the attachment from loosening due to vibration and to render it particularly suitable for use in constructions manufactured by a moulding or die-casting process.

According to the invention the combination of a member and a support, the member being secured in a recess of the support by means of at least one spring, is characterized in that use is made of at least one helical or spiral spring, of each of which one end (the clamping end) in the direction of its longitudinal axis exerts pressure on the member to be secured, and the other end (the anchored end), which is provided with a lateral extension, bears with this extension in a depression of the support, the arrangement being such that the two ends of the compressed and twisted spring are locked against relaxation in the axial and tangential directions and against lateral shift.

The sole part required in addition to the member and the support is a spring, which can be mass manufactured in a very cheap manner. The additional cost of shaping the support and, if necessary, of the member are practically negligible for members moulded in bulk. Attachment may be effected very rapidly and thus also involves little cost. The spring cannot become loose due to vibration, but it can readily be removed and replaced.

At least part of each spring adjacent one extremity is preferably locked against lateral shift in that at least this part bears in a suitable recess of the support or of the member. More particularly, in the case of a moulded support, this recess can readily be provided. In this case, the member is preferably provided with, for example, two rod-shaped extensions, which in certain cases, for example, in the case of a shaft, already are present, while the said recess of the support is a cylindrical cavity extending in the direction in which the moulding or die-casting is removed from the matrix (moulding direction) and having a slot in the surface of the support, the slot extending parallel to the longitudinal axis of the cavity and allowing the said extension access to the cavity.

In a further embodiment, a spring or part thereof surrounds a mandril formed on the member or on the support and prevents a lateral shift of the spring or of at least one of its ends.

In order that the invention may be more clearly understood and readily carried into effect, it will now be described more fully with reference to the accompanying diagrammatic drawing.

Fig. 1 is a perspective view of the device embodying the present invention.

Fig. 2 shows an auxiliary tool suitable for compressing and twisting a spring of the type employed with the present invention.

Fig. 3 is a sectional view taken on the lines 3—3 of Fig. 4 showing a modification of the device embodying the present invention.

Fig. 4 is a sectional view taken along the lines 4—4 of Fig. 3.

Fig. 5 is a perspective view of another embodiment of the present invention

Referring now to Fig. 1, which is a perspective view, a shaft for a rope disc is secured to the cabinet consisting of moulded material of a radio receiver. On the inner side of one cabinet wall 3, the walls each extending parallel to the moulding direction (vertical in the drawing), is formed an elevation 5 which extends to the bottom 7 of the cabinet. The elevation 5 is provided with a cylindrical cavity 9 (the arrow of the reference numeral indicates the longitudinal axis of the cavity) which accommodates a helical spring 11. A slot 13, the longitudinal direction of which is parallel to the longitudinal axis of the cavity is provided in the elevation 5 to enable the end of the shaft 1 to be secured to be inserted into the cavity 9. The elevation 5 has a re-entrant part 5' in which a slot 15 is milled parallel to the bottom 7.

At the lower end of the shaft 1 (clamping end), the spring 11 has an axial extension 11a, which laterally engages the shaft 1, whereas the other end of the spring is provided with a lateral extension 11b (here tangential).

The spring 11 is introduced into cavity 9, and then compressed and slightly twisted, for example, by means of the tool shown in Fig. 2 or manually the extension 11b being moved (as viewed from above) in a clockwise direction. After release, the extension 11b clicks into the slot 15 and is then anchored against further relaxation by turning in the anti-clockwise direction and also against relaxation in the axial direction, i. e. in the longitudinal direction of the slot 9. Furthermore, the top end of the spring 11 is supported by the wall of the cavity 9 against lateral shift, so that this wall absorbs the reaction of the force exerted in the horizontal direction by the extension 11b.

The lower end of the spring 11 clamping the shaft 1 is locked against rotation in the direction of relaxation, since the extension 11a bears against the shaft 1; the axial force is effectively used for securing the attachment end of the shaft 1 while lateral shift, as before, is prevented by the walls of the cavity 9.

It will be seen that the shaft is thus secured so as to be free from play with the use of a single very simple resilient member which can readily be arranged, which does not become loose due to vibration, but which can readily be removed. The other end of the shaft 1 may be secured in an exactly similar manner to the wall of the moulded cabinet opposite the wall 3, since it is possible to insert the shaft from above through the two slots 13 into the two cavities 9. The elevation 5, together with the cavity 9 and the slot 13, may be formed during the operation of moulding the cabinet 3, 7, with little additional cost, and the slot 15 is provided by a simple milling operation, which also involves little increase in cost.

Figs. 3 and 4 are two cross-sectional views taken at right angles to one another along the lines III—III and IV—IV, respectively, of a gramophone pick-up head in which use is made of two sapphire needles adapted to be used alternately. Such pick-up heads permit of playing two kinds of records, for example records to be played at a speed of 78 revs./min. and records to be played at a speed of 33 revs./min.

The pick-up head comprises a piezo-crystal having two sapphire needles 21 and 23 arranged at an angle with each other and apart from the needles, is contained in an elongated box 25 of moulded material. This box is arranged to be pivotal through a limited angle in a housing 27 provided at the end of a pick-up arm (not shown). The box 25 is rotatable about its longitudinal axis in a manner such that the two needles 21 and 23 may alternately be brought into the operating position.

The housing 27 is substantially semi-circular in section (Fig. 4) and the cross-section of the box 25 has a suitable circular part. Formed at each end (only one is shown in detail) of the box 25 is an axial elevation 29, which is urged by a conical spiral spring 31 against the cylindrical inner wall of the housing 27. The elevation 29 may be shifted along this wall, the box 25 then rotating about its longitudinal axis, but the freedom of movement is restricted in that the elevation 29 is provided in a rectangular space 33, formed between locally thickened walls 27a and 27b of the housing 27. Since midway between the walls 27a and 27b a rib 35 is formed on the inner wall of the housing 27, the elevation 29, as is shown in Fig. 4, may occupy either of two preset positions, in which either of the two needles 21 and 23 is vertical when viewed as in Fig. 4.

The walls 27a and 27b (primarily the latter in the case shown) support the anchored end of a compressed and twisted spring 31 (the base of the cone) against lateral shift in co-operation with the terminal wall of the box 25. At the other end (attachment end) of the spring 31, this function is fulfilled in that the spring is provided about a projecting mandril 37, (this is conical in the case shown) on the elevation 29.

In order to avoid relaxation of the spring 31, the attachment end and the anchored end are provided, in a manner similar to that shown in Fig. 1, with an axial extension 31a and a lateral extension 31b, respectively. The former bears against the elevation 29, the latter lies in a slot 41 provided in the terminal wall of the housing 27.

The box 25 and the housing 27 are both capable of being moulded (the slot 41 is provided by a milling operation) so that they can be made at low cost. The spring 31 is conical, in order to permit the desired freedom of movement of the elevation 29 and the attachment end of the spring between the walls 27a and 27b.

It is obvious that the construction shown in Figs. 3 and 4 may, as an alternative, be used for securing a member in one fixed position, in a manner similar to that shown in Fig. 1.

Fig. 5 shows an embodiment in which a gramophone pick-up head 51 is housed in a cup-shaped support 53 by means of two helical springs 55 (one is visible in Fig. 5) each of which surrounds a cylindrical mandril 57 projecting from the head 51. Each mandril 57 supports the two ends of the associated spring 55 against lateral shift. The spring is locked against relaxation, as may be seen from Fig. 5, in a manner similar to that shown in Fig. 1 and Figs. 3 and 4.

It is obvious that the attachment shown in Fig. 5 may also be used in the pick-up head shown in Figs. 3 and 4. It will furthermore be evident that in Fig. 5 the mandril 57 may, as desired, be formed on the bottom of the box 53 and may be replaced by a recess in the part 51 into which the spring 55 fits, while other combinations are also possible.

An important advantage of the attachment described is that it may also be used with thermoplastic die-casting or moulding material, since with the use of this material screw fastening is in practice unserviceable, since screws in this material ultimately become loose.

What I claim is:

1. A combination of member and support, a recess in said support, means to secure said member in said recess, said means comprising a coil spring located within the walls of said recess, said spring having a clamping end disposed directly against said member to exert pressure in the direction of its longitudinal axis, the other end of said spring having a lateral extension which is disposed in a depression in said support to anchor said spring to said support, the compression and torsional forces thus set up in said spring locking the ends of said spring against relaxation in the axial and tangential direction, and the walls of the recess preventing lateral shifting of the spring.

2. A combination of member and support, a recess in said support, means to secure said member in said recess, said means comprising a coil spring located within the walls of said recess, said spring having a clamping end disposed directly against said member to exert pressure in the direction of its longitudinal axis, a mandril projecting from said member, the other end of said spring surrounding said mandril and having a lateral extension which is disposed in a depression in said support to anchor said spring to said support, the compression and torsional forces thus set up in said spring locking the ends of said spring against relaxation in the axial and tangential direction, the walls of the recess and said mandril preventing lateral shifting of the spring.

3. A combination of member and support, said support being made of moulded material, a cylindrical cavity in said support, said cavity having its longitudinal axis extending in the moulding direction, the wall of said cavity being formed with a slot parallel to said longitudinal axis through which the member is introduced into said cavity, means to secure said member in said cavity, said means comprising a coil spring located within the walls of said cavity, said spring having a clamping end disposed directly against said member to exert pressure in the direction of its longitudinal axis, the other end of said spring having a lateral extension which is disposed in a depression in said support to anchor said spring to said support, the compression and torsional forces thus set up in said spring locking the ends of said spring against relaxation in the axial and tangential direction, and the walls of the cavity preventing lateral shifting of the spring.

4. A combination of member and support, said support being made of moulded material, a cylindrical cavity in said support, said cavity having its longitudinal axis extending in the moulding direction, the wall of said cavity being formed with a slot parallel to said longitudinal axis through which the member is introduced into said cavity, means to secure said member in said cavity, said means comprising a coil spring located within the walls of said cavity, said spring having a clamping end which is provided with a substantially axial extension disposed directly against that part of said member which is in said cavity to exert pressure in the direction of its longitudinal axis, the other end of said spring having a lateral extension which is disposed in a depression in said support to anchor said spring to said support, the compression and torsional forces thus set up in said spring locking the ends of said spring against relaxation in the axial and tangential direction, and the walls of the cavity preventing lateral shifting of the spring.

5. A combination of member and support, a recess in said support, means to secure said member in said recess in either of two positions, said means comprising a spiral spring located within the walls of said recess, the base of said spring having a diameter substantially the same as the recess, said spring having a clamping end at its top end disposed directly against said member to exert pressure in the direction of its longitudinal axis, the base of said spring having a lateral extension which is disposed in a depression in said support to anchor said spring to said support, the compression and torsional forces thus set up in said spring locking the ends of said spring against relaxation in the axial and tangential direction, and the walls of the recess preventing lateral shifting of the spring.

6. A combination of member and support, a recess in said support, a cavity in said member, a mandril positioned in said cavity and projecting therefrom, a coil spring surrounding said mandril having one end disposed directly against said member to exert pressure in the direction of the longitudinal axis of said member, the other end of said spring having a lateral extension positioned in said recess, the compression and torsional forces thus set up in said spring against relaxation in the axial and tangential direction, the walls of said cavity and said mandril preventing lateral shifting of said spring.

7. A combination of member and support, a recess in said support, means to secure said member against movement in said recess, said means including a coil spring in said recess having a clamping end disposed directly against said member to exert clamping pressure in the direction of its longitudinal axis, the other end of said spring having a lateral extension which is disposed in a depression in said support to anchor said spring to said support, the compression and torsional forces thus set up in said spring locking the ends of said spring against relaxation in the axial and tangential direction, and the walls of the recess preventing lateral shifting of the spring.

JAN WIJCHMAN.

References Cited in the file of this patent
UNITED STATES PATENTS

| Number | Name | Date |
|---|---|---|
| 492,465 | Fender | Feb. 28, 1893 |
| 1,787,786 | Jerome | Jan. 6, 1931 |
| 2,392,178 | Paget | Jan. 1, 1946 |
| 2,488,709 | Colwell | Nov. 22, 1949 |